(12) United States Patent
Steffens et al.

(10) Patent No.: US 8,949,845 B2
(45) Date of Patent: Feb. 3, 2015

(54) SYSTEMS AND METHODS FOR RESOURCE CONTROLLING

(75) Inventors: Elisabeth Francisca Maria Steffens, Eindhoven (NL); Tomas Henriksson, Sollentuna (SE)

(73) Assignee: Synopsys, Inc., Mountain View, CA (US)

( * ) Notice: Subject to any disclaimer, the term of this patent is extended or adjusted under 35 U.S.C. 154(b) by 409 days.

(21) Appl. No.: 13/256,141

(22) PCT Filed: Mar. 11, 2010

(86) PCT No.: PCT/US2010/026988
§ 371 (c)(1),
(2), (4) Date: Nov. 23, 2011

(87) PCT Pub. No.: WO2010/105060
PCT Pub. Date: Sep. 16, 2010

(65) Prior Publication Data
US 2012/0060169 A1    Mar. 8, 2012

(30) Foreign Application Priority Data
Mar. 11, 2009 (EP) .................................. 09154844

(51) Int. Cl.
*G06F 9/46* (2006.01)
*G06F 13/16* (2006.01)
*G06F 13/362* (2006.01)

(52) U.S. Cl.
CPC ............ *G06F 13/161* (2013.01); *G06F 13/362* (2013.01)
USPC .......................................... 718/104; 711/158

(58) Field of Classification Search
USPC .......................................... 718/104; 711/158
See application file for complete search history.

(56) References Cited

U.S. PATENT DOCUMENTS

| | | | |
|---|---|---|---|
| 4,493,036 A | 1/1985 | Boudreau et al. |
| 5,193,090 A | 3/1993 | Filipiak et al. |
| 5,917,822 A | 6/1999 | Lyles et al. |
| 6,105,094 A | 8/2000 | Lindeman |
| 6,198,724 B1 | 3/2001 | Lam et al. |
| 6,223,244 B1 | 4/2001 | Downer et al. |
| 6,240,458 B1 | 5/2001 | Gilbertson |

(Continued)

FOREIGN PATENT DOCUMENTS

| | | |
|---|---|---|
| CN | 1495614 A | 5/2004 |
| CN | 101286946 A | 10/2008 |

(Continued)

OTHER PUBLICATIONS

PCT International Search Report and Written Opinion, PCT Application No. PCT/US2010/026988, Jun. 2, 2010, 12 pages.

(Continued)

*Primary Examiner* — Diem Cao
(74) *Attorney, Agent, or Firm* — Fenwick & West LLP

(57) ABSTRACT

A resource controller that includes a first buffer configured to store requests of a first predefined category having a first priority. In addition, the resource controller includes at least a second buffer configured to store requests of a second predefined category having a second priority where the first priority is set such that processing requests of the first category has priority over processing the requests of the second category. Also, the resource controller includes a mechanism configured to block the requests of the first category when a predefined condition is met.

10 Claims, 2 Drawing Sheets

(56) References Cited

U.S. PATENT DOCUMENTS

| | | |
|---|---|---|
| 6,629,220 B1 | 9/2003 | Dyer |
| 6,721,273 B1 | 4/2004 | Lyon |
| 6,954,844 B2 | 10/2005 | Lentz et al. |
| 7,062,582 B1 | 6/2006 | Chowdhuri |
| 7,143,219 B1 | 11/2006 | Chaudhari et al. |
| 7,203,621 B1 | 4/2007 | Veitch et al. |
| 7,219,347 B1 | 5/2007 | Waddington |
| 7,263,587 B1 | 8/2007 | Yeh et al. |
| 7,577,780 B2 | 8/2009 | Huang et al. |
| 7,668,177 B1 | 2/2010 | Trapp et al. |
| 8,150,407 B2 | 4/2012 | Ho et al. |
| 8,285,914 B1 * | 10/2012 | Venkatramani et al. ........... 711/5 |
| 8,307,139 B1 | 11/2012 | Chowdhuri |
| 2002/0069310 A1 | 6/2002 | Scandurra et al. |
| 2002/0178148 A1 | 11/2002 | Sobel et al. |
| 2003/0074507 A1 | 4/2003 | Weber |
| 2003/0081624 A1 | 5/2003 | Aggarwal et al. |
| 2003/0177296 A1 | 9/2003 | Kurth |
| 2004/0030844 A1 | 2/2004 | Tojima et al. |
| 2004/0059879 A1 | 3/2004 | Rogers |
| 2005/0066138 A1 | 3/2005 | Horn et al. |
| 2006/0149874 A1 | 7/2006 | Ganasan et al. |
| 2006/0184746 A1 | 8/2006 | Guthrie et al. |
| 2006/0262748 A1 | 11/2006 | Dahl et al. |
| 2007/0008978 A1 | 1/2007 | Pirzada et al. |
| 2007/0022238 A1 | 1/2007 | Metsker |
| 2007/0101033 A1 | 5/2007 | Chen et al. |
| 2008/0065801 A1 | 3/2008 | Fukuyama et al. |
| 2008/0077720 A1 | 3/2008 | Fanning |
| 2008/0091866 A1 | 4/2008 | Cox et al. |
| 2010/0115167 A1 | 5/2010 | Tardieux et al. |
| 2010/0278190 A1 | 11/2010 | Yip et al. |

FOREIGN PATENT DOCUMENTS

| | | |
|---|---|---|
| JP | 62-026563 A | 2/1987 |
| WO | WO 2008/015496 A1 | 2/2008 |

OTHER PUBLICATIONS

PCT International Search Report and Written Opinion, PCT Application No. PCT/IB2009/054961, Feb. 5, 2010, 9 pages.

Chinese First Office Action, Chinese Application No. 201080019117.4, Nov. 19, 2013, 14 pages.

Chinese First Office Action, Chinese Application No. 200980153669.1, Jul. 3, 2013, 24 pages.

Bianchini, R. et al., "Can High Bandwidth and Latency Justify Large Cache Blocks in Scalable Multiprocessors," 1994 International Conference on Parallel Processing, ICPP 1994, Aug. 15-19, 1994, pp. 258-262, vol. 1.

Breitbart, Y. et al., "Efficiently Monitoring Bandwidth and Latency in IP Networks," Proceedings of the Twentieth Annual Joint Conference of the IEEE Computer and Communications Societies, INFOCOM 2001, 2001, pp. 933-942, vol. 2.

Hamad, O.F. et al., "Induced Packet Loss Reduction by Max-Heap Overlay Construction based on the Bandwidth—Latency Product Measures," $4^{th}$ International Conference on Innovations in Information Technology, IIT '07, Nov. 18-20, 2007, pp. 626-630.

Hyde, R.L. et al., "Degenerate Sharing," International Conference on Parallel Processing, ICPP 1994, Aug. 15-19, 1994, pp. 267-270, vol. 1.

Pögel, T. et al., "Passive Client-Based Bandwidth and Latency Measurements in Cellular Networks," 2012 IEEE Conference on Computer Communications Workshops (INFOCOM WKSHPS), Mar. 25-30, 2012, pp. 37-42.

Chinese Second Office Action, Chinese Application No. 201080019117.4, Aug. 4, 2014, 14 pages.

* cited by examiner

SYSTEMS AND METHODS FOR RESOURCE CONTROLLING

CROSS-REFERENCE TO RELATED APPLICATIONS

This application is a national stage application of International Application No. PCT/US2010/026988, filed on Mar. 11, 2010, which claims the benefit of European Patent Application No. 09154844.6 filed on Mar. 11, 2009, the entire contents of both applications being incorporated herein by reference.

FIELD OF THE INVENTION

The present application relates to a method for resource controlling. More particularly, the present application relates to a method for resource controlling comprising controlling the processing of requests of a first category having a first priority and controlling the processing of requests of a second category having a second priority, wherein the first priority is set such that processing the requests of the first category has priority over processing the requests of the second category. The present application relates also to a resource controller, a system-on-chip comprising said resource controller, a consumer electronic device comprising said system-on-chip and a computer program comprising instructions operable to cause a processor to perform said method.

BACKGROUND OF THE INVENTION

Nowadays, consumer electronic devices, such as televisions, PCs, mobile phones and the like, comprise system-on-chip (SoC) multiprocessors. The benefits of SoCs are their high performance, large flexibility and low cost. Furthermore, both the impact of programmable hardware on the total silicon area and the power consumption in the consumer electronic device can be reduced by employing a SoC.

The basic problem of SoCs is the communication between the processing units on the SoC and one or more external resources, like external memories or similar units. More particularly, a resource must be shared between several processing units or agents implemented on the SoC. A common concern is that the resource utilization must be high. Thereby, the overhead of using the resource may depend on the sequence of requests.

One approach is to split the requests sent by the processing units into at least two categories and assign the highest priority to one of these categories. For instance, the requests can be split into low latency traffic requests on the one hand and constant bandwidth traffic requests on the other hand. Normally, the low latency traffic requests comprise the higher priority. To prevent the lower priority traffic requests from starvation, the low latency requests must be limited. According to prior art, the processing of low-latency requests are limited based on their own bandwidth usage.

SUMMARY OF THE INVENTION

It is one objective of the present application to provide a method which improves resource controlling. It is another objective to prevent unnecessarily long average latency for low latency requests. A further objective is to facilitate the determination of accurate traffic budget. Another objective is to ensure sufficient bandwidth for constant bandwidth requests. Another objective is to provide a method which is particular suitable for controlling data transfer between a SoC and fast memory devices.

These and other objectives are solved by a method for resource controlling comprising controlling the processing of requests of a first category having a first priority. The method comprises controlling the processing of requests of a second category having a second priority, wherein the first priority is set such that processing the requests of the first category has priority over processing the requests of the second category. The method comprises blocking requests of the first category by a mechanism that detects when a predefined condition regarding a service provided to the second category requests is met.

The present method can be generally used for controlling the data transfer between at least one processing unit or agent and a resource, like a memory. In particular, the method can be used for controlling the data transfer between a plurality of processing units or agents arranged on a system-on-chip and one or more external resources, such as memories, in particular fast external memories.

The requests or data transfer requests sent by the at least one processing unit are divided into at least two different categories. In general, different system parameters or user wishes can be taken into account for determining the at least two categories. For instance, the requests can be divided into at least two categories or types depending on the required bandwidth, a maximum allowable latency, data size, processing unit, which has generated the request, transaction rate, and the like. The division should be performed such that a high performance for resource controlling, like memory controlling, can be ensured.

In particular, the division can be performed such that requests of one of these categories may be more important or should be preferably processed compared to the requests of the other category. This category may have a higher priority, the first priority, than the other category. In other words, the requests of the first category having the higher priority are normally processed.

It is found according to the present application that processing the requests of the second category may be ensured in a sufficient manner while requests of the first category are pending, if a pending request of the second category is processed while a predefined condition is met regarding the service provided to the second category. Contrary to expectation it is found that the bandwidth and/or transaction rate or transaction capacity required for processing requests of the second category may be protected by blocking the high priority requests while the predefined condition is met. For instance, the requests of the second category may be processed within a limited time after detecting that the predefined condition has been met. It shall be understood that the requests may be also processed immediately after detecting that the predefined condition has been met.

The present application may provide for improved resource controlling, such as memory controlling. Unnecessarily high average latency of high priority requests may be prevented while at the same time sufficient bandwidth may be ensured for requests having low priority.

According to a further embodiment of the present application, the requests of the first category are blocked for allowing at least one request of the second category to be processed the predefined condition regarding the service provided to the second category requests is met.

In addition, according to a first aspect, the predefined condition may be that a bandwidth-and-latency service guarantee is about to be violated.

Moreover, according to a second aspect, the predefined condition may be that a transaction-rate-and-latency service guarantee is about to be violated.

The processing of the requests of the second category while requests of the first category are pending may be achieved by explicitly blocking requests from the first category. For instance, blocking the requests of the first category may be controlled by an accounting mechanism.

Furthermore, according to another embodiment, the imminent violation of the bandwidth-and-latency service guarantee and/or transaction-rate-and-latency service guarantee can be detected by an up-down counter reaching a predefined threshold, wherein the up-down counter keeps track of the service which the requests of the second category have received. The up-down counter may be implemented within an accounting mechanism. The up-down counter can count up for second category request service cycles and down for non second category request service cycles, or vice versa. For instance, in the case of net accounting, a transfer cycle is a transfer cycle and in the case of gross accounting, it is a transfer or preparation cycle.

According to a further embodiment, the service for the requests of the second category can be defined in at least one of the terms gross cycles or net cycles. In case that the predefined condition is associated with a transaction-rate-and-latency service guarantee the use of net cycles may be advantageous.

For instance, the service cycles may include only the cycles when data is transferred on the interface. That is referred to as net accounting. Another option is to include the data transfer cycles as well as preparation cycles in the service cycles. That is referred to as gross accounting. For instance, cycles which have to elapse for meeting the predefined condition are net cycles or data transfer cycles.

According to another embodiment of the present application, the requests of the first category may be requests for low latency traffic. The low latency traffic may require an average low latency. However, it may not need any guarantee on the latency or on the bandwidth or on the transaction rate. It may be advantageous to assign the highest priority to this kind of traffic requests.

Furthermore, according to another embodiment, the requests of the second category may be requests for constant bandwidth traffic. The constant bandwidth traffic may require a guaranteed minimum bandwidth and a guaranteed maximum latency.

In another embodiment, the predefined threshold value can be set, the initial value of the up-down-counter can be set, and the increment value and the decrement value of the up-down-counter can be set.

In addition, it is found that detecting when the predefined condition is met, like a predefined threshold is reached by an up-down-counter, can be performed in an easy way, if an accounting mechanism is implemented.

In another embodiment, the accounting value may be changed by a first predefined change value if no request of the second category is processed. In other words, the accounting value is associated with the requests of the second category resulting in a direct protection of the requests of the second category, such as the constant bandwidth requests and/or a guaranteed transaction rate request. The first predefined change value may represent a particular number of cycles. The accounting value can be changed by a first predefined change value in case at least one request of the second category is pending but not processed. It may be advantageous to change the accounting value periodically, like every clock cycle. In other words, the accounting value can be updated every clock cycle for ensuring an exact accounting mechanism and an accurate detection possibility. Updating the accounting value includes resetting the accounting value to the initial value if no request of the second category is pending.

According to a further embodiment of the present application, the first predefined change value may be an increment value or a decrement value. In other words, the accounting value can be incremented and/or decremented.

In another embodiment, the accounting value may be changed by a first predefined change value if no request of the second category is processed. In other words, the accounting value is associated with the requests of the second category resulting in a direct protection of the requests of the second category, such as the constant bandwidth requests and/or a guaranteed transaction rate request. The accounting value can be changed by a first predefined change value in case at least one request of the second category is pending but not processed. It may be advantageous to change the accounting value periodically, like every clock cycle. In other words, the accounting value can be updated every clock cycle for ensuring an exact accounting mechanism and an accurate detection possibility. Updating the accounting value includes resetting the accounting value to the initial value if no request of the second category is pending.

According to another embodiment of the present application, the accounting value can be changed by a second predefined change value if a request of the second category is processed. The second predefined change value may be also an increment or decrement value. It may be advantageous, if the second predefined value is an opposite value, i.e. if the first change value is an increment value, the second change value is a decrement value and vice versa.

Furthermore, the accounting mechanism may be easily implemented by defining a threshold value. The threshold value may be the bound at which processing of a pending request of the second category is due. In other words, the predefined condition is met. More particularly, according to a further embodiment, the predefined threshold value may be set and it may be detected when the accounting value is changed by one of the changing value such that the predefined threshold value is reached. Then the requests of the first category may be blocked. For instance, when the accounting value has reached the threshold value the second category requests is boosted by blocking the first category requests. It shall be understood that some cycles may elapse after detecting that the threshold has been reached before the first category request are blocked for allowing to process remaining data of a first category first. The threshold value can be chosen depending on the initial accounting value. By way of example, the initial accounting value can be set smaller than the threshold value causing that the first change value is an increment value. Otherwise, the first change value is a decrement value. Since an exact calculation is provided due to the use of the transfer cycle as the relevant index, unnecessarily long average latency for low latency requests may be prevented as well as sufficient bandwidth for constant bandwidth requests may be ensured by using the method according to the present application.

Moreover, in another embodiment, the at least one request of the second category can be processed if no request of the first category is pending. If no other requests than the second category requests are pending, these requests can be processed while the predefined condition is not met. The available bandwidth and processing time may be used optimally.

It may be also possible that more than merely two categories can be defined. According to a further embodiment, processing of requests of a third category having a third priority can be controlled. The priority may be higher, smaller, or a value which is between the previously mentioned priorities. For instance, requests of a third category may be internal commands, like refresh commands. These requests can be handled similar to the above stated requests.

It may be a gist of the application to provide a method for resource controlling, e.g. a method which may be able to unify the arbitration in a memory controller with the arbiters in a concentration network. For resource controlling it may be important fact which has to be observed that low priority requests need a guaranteed bandwidth and latency to make sure that on-chip buffers never overflow or run empty. That traffic is therefore called constant traffic (CTR).

According to a first exemplary aspect such a method may use bandwidth protection. A method according to this first aspect may guarantee bandwidth and latency for a low priority stream of requests in a memory controller, e.g. by using a blocking switch for a high priority stream of requests. For example, the switch may be controlled by an up-down counter that keeps track of how bandwidth has been given to the low priority stream lately. When the account reaches a threshold value, the high priority request stream may be blocked.

According to a second exemplary aspect such a method may use transaction rate protection. A method according to this second aspect may be able to provide transaction-rate guarantee and latency guarantees for individual streams. It may in particular useful to use transaction rate protection, e.g. counting the number of transaction for the high priority stream requests and/or the low priority stream requests, since the memory controller is typically used in combination with other concentrators for CTR that may be based on transactions. Furthermore, a method according to the second aspect may be advantageously used in case different request streams have different transaction sizes so that a concentrator multiplexes a number of streams into a single stream with varying transaction size. In this case, although different transaction sizes may be used, no recomputing for a latency-rate guarantee may be necessary so that no accuracy due to this recomputing may be lost. Thus, overdimensioning of the on-chip buffers and/or the allocated rate to the CTR in the memory controller may be avoided. Summarizing a method according to the second aspect may be suitable to accurately compute the guarantees per individual CTR streams before the concentrator, Thereby the overdimensioning of the buffers may be reduced. Also the allocation to CTR in the memory controller may be made with high accuracy, which may lead to an improved average service for high priority requests because they may be blocked less often. In the method according to the second aspect the memory controller may be changed to give guarantee in terms of transaction(s), since it may not be advisable to split up transactions in the concentrators outside of the memory controller. It this context it should be noted that for a single stream the product of transaction rate and transaction size may be the bandwidth.

In general the methods according to both exemplary aspects are similar, e.g. both may use similar mechanisms to block high priority requests. However, the method according to the first exemplary aspect accounts bandwidth (bytes/sec), while the method according to the second exemplary aspect accounts transaction rate (transactions/sec).

Another aspect of the present application is a resource controller comprising a first buffer configured to store requests of a first predefined category comprising a first priority. The resource controller comprises at least a second buffer configured to store requests of a second predefined category comprising a second priority, wherein the first priority is set such that processing the requests of the first category has priority. The resource controller comprises a mechanism configured to block the requests of the first category when a predefined condition is met.

The resource controller comprises a mechanism configured to block the requests of the first category at the entrance of the buffer when a predefined condition regarding the second category is met.

For instance, the resource controller may be a memory controller or any other kind of controller for managing data transfer between a plurality of clients and at least one shared resource.

According to a further embodiment of the present application, at least one buffer may be formed as a FIFO buffer. The low latency traffic requests and/or the constant bandwidth traffic requests can be treated in separate queues. It shall be understood that according to other variants of the present application, all implemented buffers can be formed as FIFO buffers.

It may be possible that the buffer units are connected to the processing units via different interfaces. More particularly, the requests of the different categories may arrive on different interfaces. In case merely one interface is provided, the resource controller may comprise a detector. For detecting the category of the received requests and for putting the requests into the respective buffer a detector can be arranged for detecting the category of a received request. A simple possibility is given for sorting the different requests sent by one or more processing units or agents.

Furthermore, the resource controller according another embodiment of the present application may comprise at least one output terminal connected to at least one shared resource, like an external memory. The output terminal or memory interface may provide a constant or variable bandwidth. It shall be understood that two or more terminals can be provided as well as two or more shared resource, such as external memories can be provided.

According to a further embodiment, the mechanism may comprise at least one blocking switch configured to block the requests of the first category. The blocking switch can be either closed, i.e. first category requests can be processed, or it can be opened, i.e. the first category requests are blocked and the second category requests can be processed.

In addition, according to another embodiment, the resource controller may further comprise a comparator configured to detect whether a predefined threshold is reached by the accounting mechanism. The comparator can be located adjacent to the up-down-counter or in a blocking switch.

In a further embodiment, the resource controller may comprise an observer unit that detects if service is given to requests of the second category.

Furthermore, according to another embodiment, the observer unit may be configured to consider at least one of transfer and preparation cycles as service for the requests of the second category or solely transfer cycles as service for the requests of the second category.

A further aspect of the present application is a system-on-chip comprising at least one above mentioned resource controller and at least one processing unit. It shall be understood that the system-on-chip may comprise one or more processing units, such as digital signal processors, central processing units, accelerators, intellectual property cores and the like.

Furthermore, the system-on-chip may comprise or be connectable to at least one shared resource, like an external memory via the resource controller, like a memory controller. It shall be understood that, according to further variants of the present application, the system-on-chip may comprise further components, like a memory access network, a control network and the like.

A further aspect of the present application is a consumer electronic device comprising the above mentioned system-on-chip. For instance, the consumer electronic device may be a television device, a PC, a mobile phone or the like.

Another aspect of the present application is a package comprising the above-described system on chip according and an off-chip memory.

Another aspect of the present application is a computer readable medium having a computer program stored thereon. The computer program comprises instructions operable to cause a processor to perform the above-mentioned method.

Another aspect of the present application is a program element, which, when being executed by a processor, is adapted to control or carry out the above-mentioned method.

These and other aspects of the present patent application become apparent from and will be elucidated with reference to the following Figures. The features of the present application and of its exemplary embodiments and/or aspects as presented above are understood to be disclosed also in all possible combinations with each other, which combinations are also envisaged by the present invention.

BRIEF DESCRIPTION OF THE DRAWINGS

In the Figures show.

DETAILED DESCRIPTION OF THE DRAWINGS

In the following detailed description of the present application, exemplary embodiments of the present application will describe and point out an enhanced resource controller and method for resource controlling which is particular suitable for use with fast external resource, such as fast external memories and which prevent unnecessary long average latency for a first category of requests, and at the same time, ensure sufficient bandwidth and/or transaction rate for requests of a second category.

In the following detailed description, for a better demonstration, the present application is elucidated by the aid of a memory controller taken merely the data transfer cycles into account. It shall be understood that any resource controller is comprised by the present application as well as gross cycles can be taken into account. It shall also be understood that gross cycles can be taken into account instead of merely the data transfer cycles.

Figure 1:
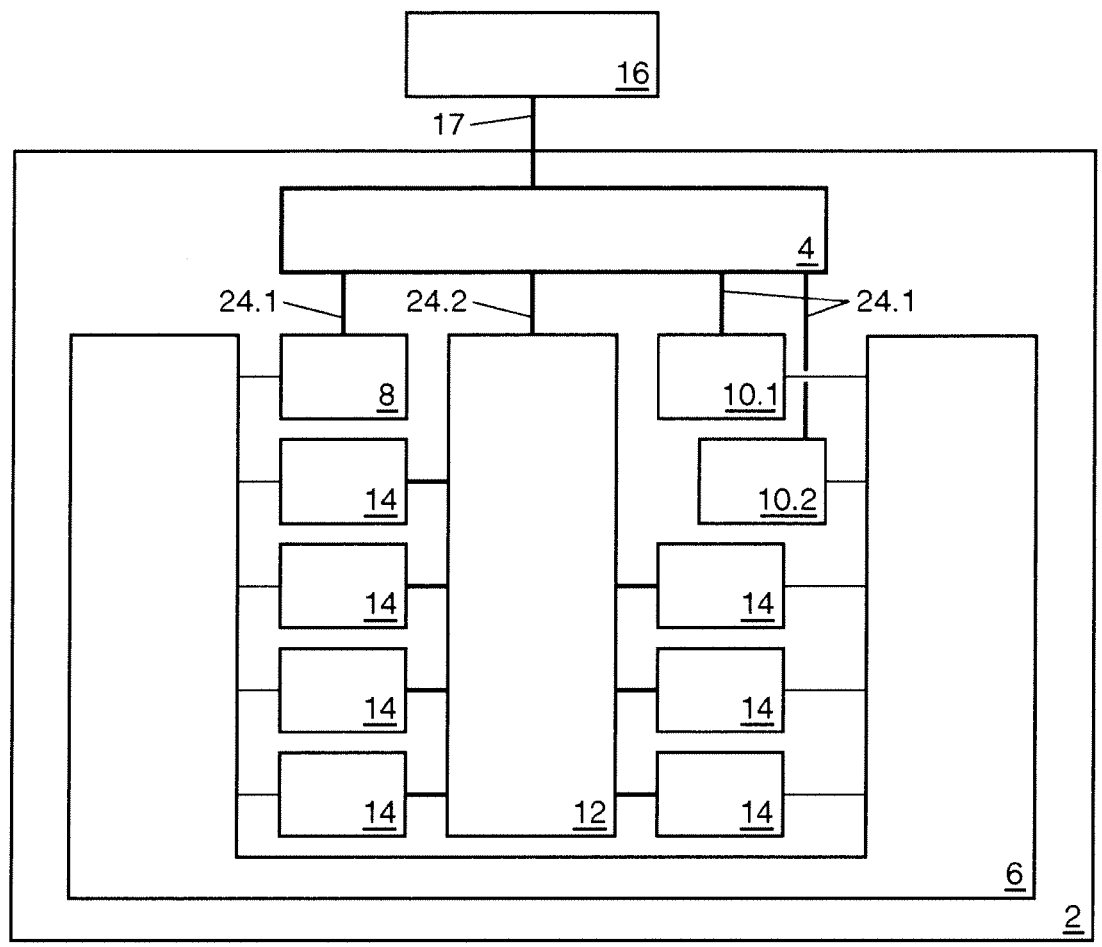
FIG. 1 an embodiment of the system-on-chip according to the present application,
FIG. 2 an embodiment of the resource controller according to the present application,
FIG. 3 a first flowchart of an embodiment of the method for resource controlling according to the present application,
FIG. 4 a second flowchart of an embodiment of the method for resource controlling according to the present application,
FIG. 5 a third flowchart of an embodiment of the method for resource controlling according to the present application.
Like reference numerals in different Figures indicate like elements.

FIG. 1 shows schematically an embodiment of a system-on-chip (SoC) according to the present application. As can be seen from FIG. 1, the shown SoC 2 is connected to an external memory 16. By way of example, a SDRAM can be employed as an external memory chip 16. In particular, fast memory devices can be used, such as a DDR2-1066 or a DDR3-1600.

The SoC 2 of the present embodiment can communicate with the external memory device 16 using a suitable memory controller 4 via a suitable output terminal 17. For instance, the output terminal 17 may be an interface device providing a high bandwidth. Besides the memory controller 4, the SoC 2 comprises a plurality of processing units 8, 10.1, 10.2 and 14. In the present embodiment, the SoC 2 comprises a first and a second digital signal processor (DSP) 10.1 and 10.2, a central processing unit (CPU) 8 and multiple accelerators 14, like intellectual property (IP) cores or the like.

All these processing units 8, 10.1, 10.2 and 14 are in communication with a control network 6. Furthermore, the accelerators 14 are connected to a memory access network 12, which is in turn connected to the memory controller 4. Additionally, the CPU 8 and the DSPs 10.1 and 10.2 are in communication with both the control network 6 and the memory controller 4.

Moreover, the processing units 8, 10.1, 10.2 are connected to the memory controller 4 via terminals 24.1 while the memory access network 12 is connected to the memory controller 4 via terminal 24.2.

It shall be understood that, according to other variants, the SoC 2 may comprise further, less and other components as well as it may be possible that two or more external memories are provided.

The memory controller 4 is configured to control the data transfer between the at least one external memory 16 and the processing units or agents 8, 10.1, 10.2 and 14 of the SoC 2. More particularly, the memory controller 4 may arbitrate between the requests from different agents.

Figure 2:
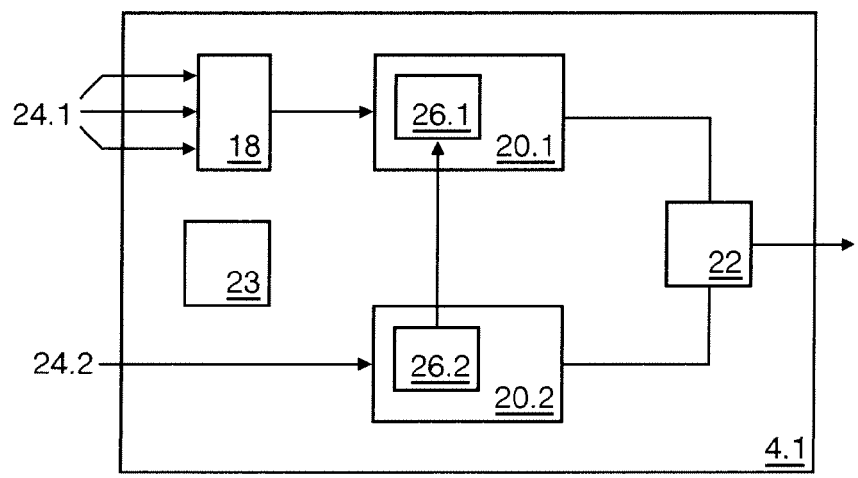

A more detailed representation of an embodiment of the memory controller 4.1 according to the present application is shown in FIG. 2. Requests for data transfer being sent by different processing units are received by the memory controller 4.1 via terminals 24.1. In case merely one terminal to the memory controller 4.1 is provided, a detector (not shown) can be arranged. The detector may be configured to detect the category of the received requests.

By way of example, the different requests can be divided into at least two different categories depending on predefined parameters, such as bandwidth requirements, latency requirements, data size, transaction rate requirements and the like. In the present embodiment, the requests are divided into a first category representing low latency traffic requests and into a second category representing constant bandwidth traffic requests. Requests of the different categories arrive at different terminals, 24.1 and 24.2.

Requests from processing units that require low average latency belong to the low latency category. Requests from other processing units belong to the constant bandwidth category. The constant bandwidth traffic requires a guaranteed minimum bandwidth after an initial latency from the arrival of the first request of the constant bandwidth category after an idle period of the constant bandwidth traffic.

For instance, the low latency traffic can be defined depending on an average low latency, which should be met. Thereby, it is not needed to guarantee a particular latency or bandwidth or transaction rate. The constant bandwidth traffic requires a guaranteed minimum bandwidth and a guaranteed maximum latency per request.

In the shown embodiment, four terminals 24.1 and 24.2 are provided, wherein the terminals 24.1 may be provided to transmit the requests of a first category, while the requests of the second category can be transmitted via terminal 24.2. Furthermore, a multiplexer 18 is arranged for handling the three input terminals 24.1. The arbitration algorithm associated with multiplexer 18 is outside the scope of this invention.

It may be possible to use FIFO buffers for storing and pre-processing the requests of the respective category. Pre-processing can include conversion of the requests on the terminals 24.1 and 24.2 to internal memory controller requests. Pre-processing can further include command generation of preparation commands for the SDRAM. The internal organization of the buffers is not part of the invention.

While the buffer 20.2 may comprise an accounting mechanism 26.2, the buffer 20.1 may comprise a blocking switch 26.1. More particularly, the blocking switch 26.1 being configured to block processing of the requests of the first category can be controlled by the accounting mechanism 26.2. A more detailed elucidation will follow subsequently.

Furthermore, the memory controller 4.1 comprises a multiplexer 22 configured to select the request to be processed. More particularly, multiplexer may select a request from buffer 20.1 if there is any. Otherwise it may select a request from buffer 20.2. The selection can be done in compliance with the timing specification of interface 17. Dependent on the timing specification for interface 17 and the recently serviced requests, there are some clock cycles in which no request can be processed although there are requests pending. Those are the cycles that we refer to as preparation cycles.

Furthermore, the memory controller 4.1 may comprise an observation unit 23, which detects what type of request is processed. By way of example, the observation unit 23 may observe the multiplexer 22 and the requests which the multiplexer selects. In this particular example, the observation unit signals to the accounting mechanism whether the current cycle is provided to a request of the second category or not. The observation unit can operate in one of two modes, dictating how the preparation cycles are assigned. In the first mode, preparation cycles are allocated to the second category (the gross mode), in the second mode (the net mode), preparation cycles are not assigned at all. The observation unit can also be dynamically configured in one of its modes. Depending on the observation result, the up-down-counter 26.2 can be incremented or decremented. A detailed elucidation of the method for memory controlling follows subsequently.

It shall be understood that, according to further variants of the present application, more than merely two different request categories can be defined, like a third category representing internal refresh commands. In addition, it may be possible that three or more buffers are provided.

Figure 3:
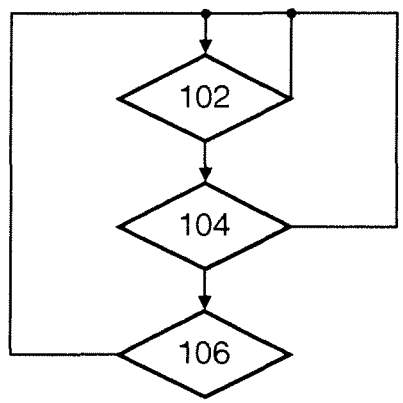

FIG. 3 shows a first simplified flowchart of an embodiment of the method according to a first exemplary aspect which method is based on accounting bandwidth. Before elucidating FIG. 3 in detail, it is mentioned that the predefined values can be set at any time. In more detail, a clip value clip_cb as well as the threshold value boost_cb can be set to respective predefined values, wherein the clip value clip_cb is the maximum value of the accounting value account_cb and the threshold value boost_cb indicates the value at or below which the requests of the first category should be blocked. The value is defined such that some clock cycles, which can be taken after blocking first-category requests until the requests of the second category can be serviced, are taken into account. As mentioned above, the clip value clip_cb can be also set to the lowest value and the threshold value boost_cb can indicate the value at or above which the requests of the first category should be blocked. Furthermore, the constant bandwidth account value account_cb is set to the clip value clip_cb, which can be also called initial accounting value. Moreover, according to the present embodiment the first change value, i.e. the decrement value num_cb, and the second change value, i.e. the increment value inc_cb=den_cb−num_cb can be programmed.

In general, the previously mentioned values can be defined according to system-on-chip requirements, user wishes or the like. In the following, exemplified values and their derivation are pointed out. The bandwidth, which is given to the constant bandwidth transfer, is $$\frac{num\_cb}{den\_cb} * gabw, \tag{a}$$

wherein the parameter gabw represents the gross available bandwidth of the employed memory interface. Then the ratio of the constant bandwidth traffic of the employed memory can be determined. By way of example, the respective ratio may be 75%. Therefore, it may be advantageous to set the decrement value num_cb to 75 and the value den_cb can be set to 100 resulting in the increment value inc_cb=den_cb−num_cb=25. In general, the predefined values can be adapted according to the behavior of the resource, like the external memory.

The guaranteed latency may be clip_cb/num_cb. To achieve this, boost should be set such that under all circumstances, the account-value does not saturate at 0.

If the threshold value boost_cb is set properly, the maximum latency guaranteed is clip_cb/num_cb clock cycles. For example, the clip value clip_cb can be set to 1500. Then the maximum latency of the constant bandwidth stream is 200 clock cycles.

After explaining the specifying of the initial values, it is referred back to FIG. 3. Every clock cycle, the accounting value can be processed in the following way. In a first step 102, it can be checked whether no constant bandwidth requests are pending. In the case no constant bandwidth requests are pending, the accounting value can be reset to the clip value clip_cb and in the next clock cycle it can be started once again with step 102. Otherwise, it is checked in step 104 whether a constant bandwidth request is serviced, i.e. data is transferred in case of net accounting or in case of gross accounting, data is transferred or prepared. In this case, the accounting value can be incremented by inc_cb. Then it can be continued with step 102 in the next clock cycle.

If a constant bandwidth request is not serviced and a constant bandwidth request is pending, the accounting value is decremented by den_cb. Then it can be continued with step 102 in the next clock cycle.

It shall be understood that the order of steps 102 to 106 may be also different. In particular, the steps can be performed in parallel.

Figure 4:
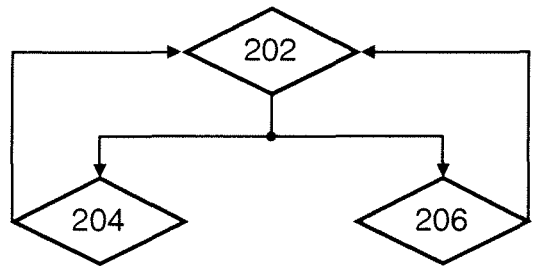

Referring to FIG. 4, a second simplified flowchart of an embodiment of the method according to the first aspect is depicted. In general, the requests having a higher priority, such as the low latency requests, are processed. At the same time as the previously mentioned method according to FIG. 3, every clock cycle it can be checked in step 202 whether the accounting value is smaller than the threshold value boost_cb. If it is detected that the accounting value is smaller than the threshold value boost_cb, for instance using a suitable comparator, the blocking switch 26.1 blocks the input to buffer 20.1 in step 204. In other words, the blocking switch 26.1 is opened. More particularly, if the constant bandwidth account value account_cb may fall below the threshold value boost_cb, the priority of the requests of the second category can be boosted. Whenever the constant bandwidth account value account_cb is smaller or equal to the threshold value boost_cb, the accounting mechanism 26.2 may block processing the low latency requested by activating (opening) the blocking switch 26.1. All low latency traffic request paths will be blocked, which after a certain delay will lead to constant bandwidth traffic requests being serviced in the presence of pending low latency traffic request paths.

Then, at the next clock cycle, it is checked once again whether the accounting value is smaller than the threshold value boost_cb. If this is not the case, the switch 26.1 is closed in step 206. Otherwise the switch 26.1 remains opened. Hence, the blocking switch is either opened or closed resulting in that either the first category requests or (after a certain delay) the second category requests can be processed.

Figure 5:
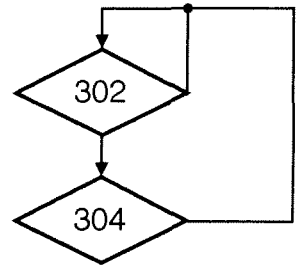

In FIG. 5, a third simplified flowchart of an embodiment of the method according to the first aspect is shown. In a first step 302 the multiplexer 22 selects a request from buffer 20.1 if there is any. Otherwise the multiplexer 22 selects a request from buffer 20.2 in step 304. The selection can be done in compliance with the timing specification of interface 17. Dependent on the timing specification for interface 17 and the recently serviced requests, there are some clock cycles in which no request can be serviced although there are requests pending. Those are the cycles that we refer to as preparation cycles.

It shall be understood that, according to other embodiments of the present application, it may be also possible to set an upper threshold value and increment the constant bandwidth account value in case no constant bandwidth traffic is serviced and check whether the constant bandwidth account value is equal or above the predefined threshold value.

Optionally a further threshold value limit_cb can be defined. For simplicity reasons this value is not taken into account in the embodiment, as shown in FIGS. 3 to 5. If the constant bandwidth account value account_cb is larger than the further threshold value limit_cb, the priority of the constant bandwidth port is lowered to background. The further threshold value limit_cb must be specified such that the equation $$\text{limit\_cb} \leq \text{clip\_cb} \quad (c)$$

is fulfilled, i.e. the maximum size of constant bandwidth transfer. The further threshold value limit_cb may protect against over-consumption by constant bandwidth transfer. If the constant bandwidth traffic is naturally bounded, the further threshold value limit_cb may be not needed.

According to the present application, it is possible to protect one constant bandwidth stream, or several independent constant bandwidth streams in an easy manner. Furthermore, it is possible according to the present application to use an accounting-based memory controller with emerging fast memory devices. For the programmer, it is facilitated to determine the constant bandwidth rate, since there is no need to include potential preparation cycles. Since the preparation time is excluded from constant bandwidth traffic accounting, the constant bandwidth rate is exact, i.e. no safety margin is needed in the rate, which leads to lower average latencies for low latency transactions.

In the following a method according to a second exemplary aspect will be described in some detail. The method according to the secondary aspect relies on the accounting of transactions instead of bandwidth as described in the context of the method according to a first exemplary aspect. However, since the methods are very similar the above described features or steps may also be valid for the method according to first exemplary aspect. Primarily, only the accounting is different. Thus, the features described in the context of FIGS. 1 to 5 may also be used in or for a method according to the second aspect. In particular, it should be noted that preferably net accounting of the transactions may be used. The account may be reset to a value clip_ctr when no constant traffic (CTR) requests are pending. Furthermore, the account may be decreased by a value num_ctr every cycle when there is a CTR request pending. The account is saturated at 0. Moreover, the account may be increased by a value inc_ctr=den_ctr−num_ctr when a CTR request is serviced. The account is saturated at clip_ctr. When the account is lower than a value boost_ctr, the high priority requests are blocked. The guaranteed transaction rate can be calculated by num_ctr/den_ctr transactions/clock cycle. The latency in a latency rate server model may be clip_ctr/num_ctr clock cycles. With a clock period of p_clk, the latency rate server parameters can be calculated by:

$$\rho = \text{num\_ctr}/\text{den\_ctr}/p\_\text{clk transaction}/s(\text{rate})$$

$$\theta = \text{clip\_ctr}/\text{num\_ctr} \times p\_\text{clks}(\text{latency}).$$

The values clip_ctr, num_ctr, den_ctr, and boost_ctr may be programmable parameters and can be described in the data sheet.

Furthermore, it is readily clear for a person skilled in the art that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. The computer software may be stored in a variety of storage media of electric, magnetic, electro-magnetic or optic type and may be read and executed by a processor, such as for instance a microprocessor. To this end, the processor and the storage medium may be coupled to interchange information, or the storage medium may be included in the processor.

What is claimed:

1. A method for resource controlling, comprising:
controlling storing requests of a first category in a first buffer using a blocking switch included in the first buffer, the request of the first category having a first priority and the blocking switch configured to block the requests of the first category from being received by the first buffer responsive to satisfying a predefined condition regarding a transaction rate provided to requests of a second category;
monitoring, using a counter, processing of stored requests of the second category stored in a second buffer, the counter included in the second buffer and configured to generate a control signal to open the blocking switch responsive to satisfying the predefined condition regarding the transaction rate provided to the requests of the second category, the requests of the second category having a second priority, the first priority set such that processing the requests of the first category has priority over processing the requests of the second category;
detecting whether the predefined condition regarding the transaction rate provided to requests of the second category has been satisfied; and
generating, by the counter, the control signal to open the blocking switch, responsive to detecting that the predefined condition regarding the transaction rate provided to the requests of the second category has been satisfied.

2. The method of claim 1, wherein the requests of the first category are blocked for allowing at least one request of the second category to be processed responsive to detecting that the predefined condition regarding the transaction rate provided to the requests of the second category has been satisfied.

3. The method of claim 1, wherein the predefined condition is satisfied when a transaction rate service guarantee is equal to a predefined threshold number of transactions.

4. The method of claim 3, wherein the transaction rate service guarantee for the requests of the second category are defined in at least one of the terms:
   gross cycles, or
   net cycles.

5. The method of claim 1, further comprising controlling processing of requests of a third category having a third priority.

6. A resource controller, comprising:
   a first buffer configured to store requests of a first category having a first priority, the first buffer comprising a blocking switch configured to block the requests of the first category from being received by the first buffer responsive to satisfying a predefined condition regarding a transaction rate provided to requests of a second category;
   an observer unit configured to detect processing of requests of the second category; and
   a second buffer configured to store requests of a second category having a second priority, the first priority is set such that processing requests of the first category has priority over processing the requests of the second category, the second buffer comprising a counter configured to keep track of a number of received requests of the second category to adjust an accounting value to indicate that a request of the second category has been processed, the counter further configured to generate a control signal to open the blocking switch responsive to satisfying the predefined condition regarding the transaction rate provided to requests of the second category.

7. The resource controller of claim 6, further comprising a comparator configured to detect whether a predefined threshold is reached by the counter.

8. The resource controller of claim 6, wherein the observer unit is configured to consider at least one of:
   transfer and preparation cycles as processing the requests of the second category, or
   solely transfer cycles as processing the requests of the second category.

9. A system-on-chip, comprising:
   at least one processing unit; and
   at least one resource controller comprising:
      a first buffer configured to store requests of a first category having a first priority, the first buffer comprising a blocking switch configured to block the requests of the first category from being received by the first buffer responsive to satisfying a predefined condition regarding a transaction rate provided to requests of a second category;
      an observer unit configured to detect processing of requests of the second category; and
      a second buffer configured to store requests of a second category having a second priority, the first priority is set such that processing requests of the first category has priority over processing the requests of the second category, the second buffer comprising a counter configured to keep track of a number of received requests of the second category to adjust an accounting value to indicate that a request of the second category has been processed, the counter further configured to generate a control signal to open the blocking switch responsive to satisfying the predefined condition regarding the transaction rate provided to requests of the second category.

10. A computer readable medium having a computer program stored thereon, the computer program comprising:
    instructions operable to cause a suitably programmed processor to perform the method comprising:
    storing of requests of a first category in a first buffer using a blocking switch included in the first buffer, the request of the first category having a first priority and the blocking switch configured to block the requests of the first category from being received by the first buffer responsive to satisfying a predefined condition regarding a transaction rate provided to requests of a second category;
    monitoring the processing of requests of the second category stored in a second buffer using a counter, the counter configured to generate a control signal to open the blocking switch responsive to satisfying the predefined condition regarding transaction rate provided to the requests of the second category, the requests of the second category having a second priority, wherein the first priority is set such that processing the requests of the first category has priority over processing the requests of the second category;
    detecting whether the predefined condition regarding the transaction rate provided to requests of the second category has been satisfied; and
    generating the control signal using the counter included in the second buffer to open the blocking switch responsive to detecting that the predefined condition regarding the transaction rate provided to the requests of the second category has been satisfied.

* * * * *